(12) United States Patent
Sanghavi et al.

(10) Patent No.: US 11,115,420 B2
(45) Date of Patent: Sep. 7, 2021

(54) DISTRIBUTED LEDGER DATA VERIFICATION NETWORK

(71) Applicant: Visa International Service Association, San Francisco, CA (US)

(72) Inventors: Viralkumar Sanghavi, Cedar Park, TX (US); Kartik Kapadia, Hayward, CA (US); Sejal Panchal, Fremont, CA (US); Mary Floren, San Francisco, CA (US); Sukrit Handa, San Mateo, CA (US)

(73) Assignee: Visa International Service Association, San Francisco, CA (US)

( * ) Notice: Subject to any disclaimer, the term of this patent is extended or adjusted under 35 U.S.C. 154(b) by 370 days.

(21) Appl. No.: 16/396,318

(22) Filed: Apr. 26, 2019

(65) Prior Publication Data

US 2020/0344236 A1    Oct. 29, 2020

(51) Int. Cl.
*H04L 29/06*     (2006.01)
*G06F 16/22*     (2019.01)

(52) U.S. Cl.
CPC ........ *H04L 63/102* (2013.01); *G06F 16/2255* (2019.01)

(58) Field of Classification Search
CPC ........................... H04L 62/102; G06F 16/2255
USPC .......................................................... 726/4
See application file for complete search history.

(56) References Cited

U.S. PATENT DOCUMENTS

| | | | |
|---|---|---|---|
| 10,181,948 B1 * | 1/2019 | Nenov | G06F 8/65 |
| 10,637,646 B2 * | 4/2020 | Krishnamacharya | H04L 63/0428 |
| 11,044,258 B2 * | 6/2021 | Zakharov | G06F 21/6218 |
| 2018/0285879 A1 * | 10/2018 | Gadnis | G06F 16/1805 |
| 2018/0288033 A1 | 10/2018 | Kamal | |
| 2018/0343120 A1 * | 11/2018 | Andrade | H04L 9/0866 |

(Continued)

FOREIGN PATENT DOCUMENTS

| | | |
|---|---|---|
| TW | I622949 B | 5/2018 |
| WO | 2018143983 A1 | 8/2018 |

(Continued)

OTHER PUBLICATIONS

EP20171096.9 , "Extended European Search Report", dated Sep. 21, 2020, 7 pages.

*Primary Examiner* — Shin-Hon (Eric) Chen
(74) *Attorney, Agent, or Firm* — Kilpatrick Townsend & Stockton LLP

(57) ABSTRACT

A system and method for verifying users are disclosed. The method includes receiving, by a server computer, from a first authorizing entity computer, an indication of a first hash of information about the user. The first authorizing entity computer has previously verified the user and stored the first hash in a first database. The server computer stores a location of the first hash in a location database. Then the server computer receives from a second authorizing entity computer a verification request message including a second hash of information about the user and retrieves the first hash from the first database using the location. The server computer compares the first hash to the second hash to determine if the hashes match. After determining that the hashes match, the server computer sends a verification response message to the second authorizing entity computer, indicating that the user was previously verified.

14 Claims, 7 Drawing Sheets

Shared Database 135

| Location marker | User ID | Hash of data | Database ID |
|---|---|---|---|
| 100001 | Company A | a4f8w3fs | Address |
| 100002 | Company A | elf93ra200a | Tax ID |
| 100003 | Company B | dp30gasq | Address |

(56) References Cited

U.S. PATENT DOCUMENTS

2018/0351747 A1    12/2018   Spangemacher et al.
2021/0160056 A1*   5/2021   Yan ..................... G06F 21/602

FOREIGN PATENT DOCUMENTS

WO     2018222211 A1    12/2018
WO     2018223125 A1    12/2018

* cited by examiner

DISTRIBUTED LEDGER DATA VERIFICATION NETWORK

BACKGROUND

User verification may be done before processes with some authorizing entities. For example, a user may be verified before receiving security clearance, initiating a financial relationship, or entering a secure area. Verification may be an intensive process that consumes significant resources. The verification process may include verifying information with many different organizations such as financial institutions and government offices. When a user is involved in multiple verification processes, each authorizing entity may repeat the same information. This can lead to unnecessary duplication of work, wasting both time and computational resources. Additionally, verification may be done with sensitive user information, such as a social security number. More efficient and secure methods of verifying information about users are needed.

Embodiments of the invention address these and other problems individually and collectively.

BRIEF SUMMARY

One embodiment of the invention includes receiving, by a server computer, from a first authorizing entity computer, a first hash of information about a user and/or an indication of the first hash of information about the user, wherein the user or information about the user has been verified by the first authorizing entity computer, and the first hash is stored in a first database. The method then includes storing, by the server computer, a location of the first hash in the first database in a location database, the first database being separate and distinct from the location database. Then the method includes receiving, by the server computer, from a second authorizing entity computer, a verification request message about the user, the verification request message comprising a second hash of information about the user and retrieving, by the server computer, the first hash from the first database using the location of the first hash. The method then includes comparing, by the server computer, the first hash to the second hash to determine if the first hash and the second hash match and determining, by the server computer, that the first hash and the second hash match. Then, responsive to determining that the first hash and the second hash match, the method includes sending, by the server computer, a verification response message to the second authorizing entity computer, the verification response message comprising verification data that the user was previously verified.

Another embodiment of the invention includes a server computer comprising a processor and a computer-readable medium, coupled to the processor, for implementing a method that includes receiving, from a first authorizing entity computer, a first hash of information about a user and/or an indication of the first hash of information about the user, wherein the user or information about the user has been verified by the first authorizing entity computer, and the first hash is stored in a first database. The method then includes storing a location of the first hash in the first database in a location database, the first database being separate and distinct from the location database. Then the method includes receiving from a second authorizing entity computer, a verification request message about the user, the verification request message comprising a second hash of information about the user and retrieving the first hash from the first database using the location of the first hash. The method then includes comparing the first hash to the second hash to determine if the first hash and the second hash match and determining that the first hash and the second hash match. Then, responsive to determining that the first hash and the second hash match, the method includes sending a verification response message to the second authorizing entity computer, the verification response message comprising verification data that the user was previously verified.

Another embodiment of the invention includes receiving, by an authorizing entity computer, information from a user and generating, by the authorizing entity computer, a hash of the information from the user. The method then includes sending, by the authorizing entity computer to a server computer, a verification request message comprising the hash and receiving, by the authorizing entity computer from the server computer, a verification response message comprising verification data that the user has been previously verified. Then the method includes storing, by the authorizing entity computer, the hash in a shared database and storing, by the authorizing entity computer, the information in a verification database.

Another embodiment of the invention includes an authorizing entity computer comprising a processor and a computer-readable medium, coupled to the processor, for implementing a method that includes receiving information from a user and generating a hash of the information from the user. The method then includes sending, to a server computer, a verification request message comprising the hash and receiving, from the server computer, a verification response message comprising verification data that the user has been previously verified. Then the method includes storing the hash in a shared database and storing the information in a verification database.

Further details regarding embodiments of the invention can be found in the Detailed Description and the Figures.

DETAILED DESCRIPTION

Figure 1:
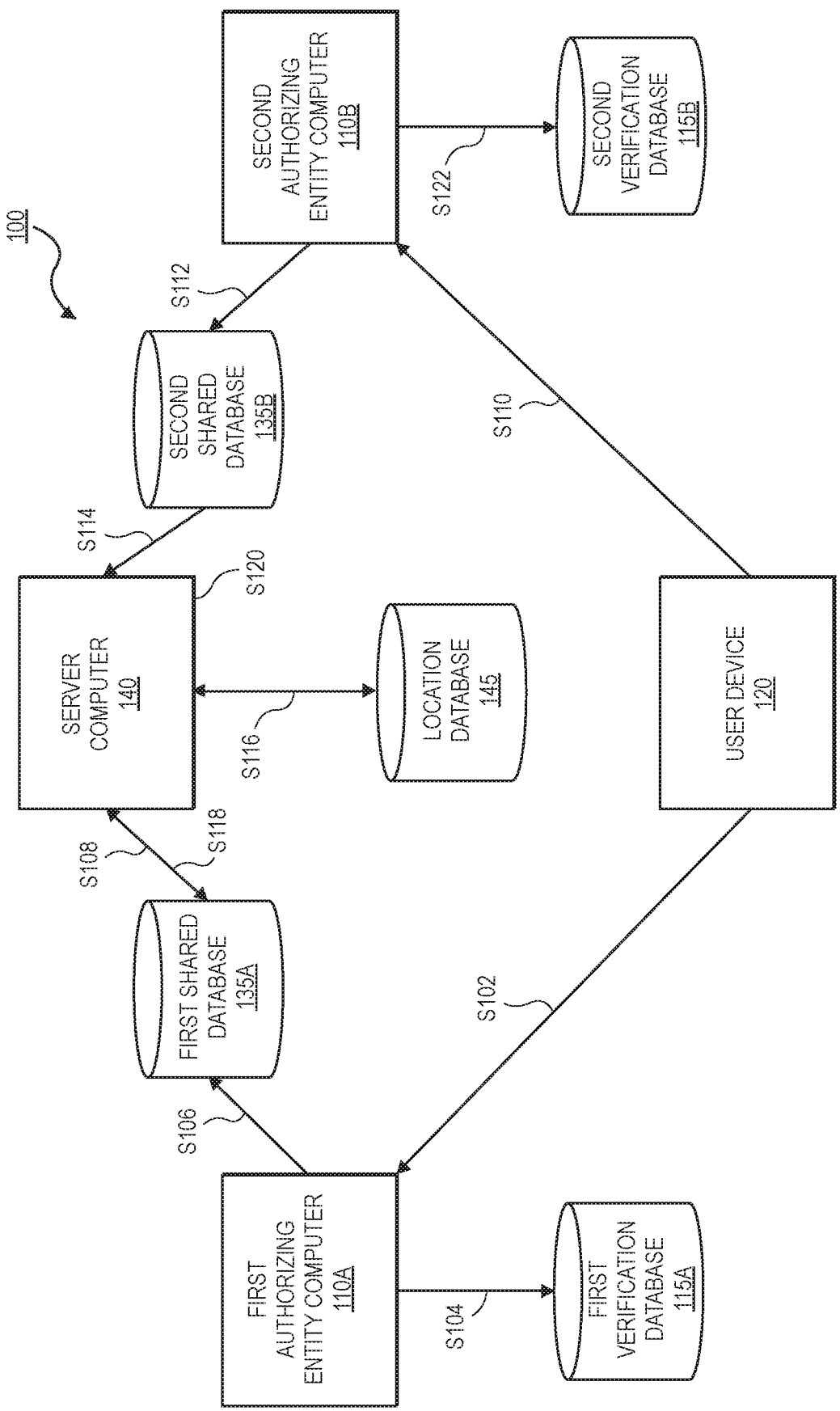
FIG. 1 shows a block diagram of a system and process flow according to embodiments.

Embodiments can provide systems and methods for verifying users based upon a verification that was previously performed by another authorizing entity. Thus, an authorizing entity can verify the user without having to complete a full verification process. This can reduce the computational time and resources spent on verification, while maintaining a high level of confidence in the verification. In embodiments, a server computer can be an intermediary between an authorizing entity that has verified a user and another authorizing entity that is attempting to verify the user. The server computer can also assess the authorizing entities to determine the strength of their verification.

Embodiments can also maintain the security of the information used in the verification process. In conventional systems, user verification may be performed with sensitive data (e.g., a social security number), and sharing sensitive data to perform a verification process can expose the sensitive data to unauthorized entities. However, in embodiments, the sensitive data that is used in the verification process is securely hashed to prevent leaking the information beyond the entities that have received the data directly from the user.

As an example, embodiments of the invention can be used when verifying the identity of an individual. A government entity (e.g., the TSA or transportation security agency) may verify the identity of a user in order to enroll them in a trusted traveler program. At a later time, the user may want to verify themselves to a bank to open an account at the bank. Embodiments can allow the bank to leverage the information verified by the government entity to verify the user to open the account. Embodiments may also be used to verify the identity of a business or organization.

Prior to discussing embodiments of the invention, some terms may be described in further detail.

An "authorizing entity" may be an entity that authorizes a request, typically using an authorizing computer to do so. An authorizing entity may complete a verification process prior authorizing requests. An authorizing entity may be an issuer, a governmental agency, a document repository, an access administrator, etc. An "authorizing entity computer" may be a computer operated by an authorizing entity.

A "user" may include an individual, a business, an organization, etc. In some embodiments, a user may be associated with one or more personal accounts and/or mobile devices. In some embodiments, the user may be a cardholder, account holder, or consumer.

A "user device" may be any suitable electronic device that can process and communicate information to other electronic devices. The user device may include a processor and a computer-readable medium coupled to the processor, the computer-readable medium comprising code, executable by the processor. The user device may also each include an external communication interface for communicating with each other and other entities. Examples of user devices may include a mobile device, a laptop or desktop computer, a wearable device, etc.

A "payment processing network" may be data processing subsystems, networks, and operations used to support and deliver authorization services, exception file services, and clearing and settlement services. An exemplary payment processing system may include VisaNet™. Payment processing systems such as VisaNet™ are able to process credit card transactions, debit card transactions, and other types of commercial transactions. Authorization, settlement, and clearing may be done at the same time (substantially simultaneously, e.g., within a few minutes or hours) or may be done as part of a batch settlement process (e.g., at the end of the day or week). The payment processing network may include a server computer. A server computer is typically a powerful computer or cluster of computers. For example, the server computer can be a large mainframe, a minicomputer cluster, or a group of server computers functioning as a unit. In one example, the server computer may be a database server computer coupled to a Web server computer. The payment processing network may use any suitable wired or wireless network, including the internet.

A "server computer" may be a powerful computer or cluster of computers. For example, the server computer can be a large mainframe, a minicomputer cluster, or a group of servers functioning as a unit. In one example, the server computer may be a database server coupled to a Web server.

A "processor" may include any suitable data computation device or devices. A processor may comprise one or more microprocessors working together to accomplish a desired function. The processor may include CPU comprises at least one high-speed data processor adequate to execute program components for executing user and/or system-generated requests. The CPU may be a microprocessor such as AMD's Athlon, Duron and/or Opteron; IBM and/or Motorola's PowerPC; IBM's and Sony's Cell processor; Intel's Celeron, Itanium, Pentium, Xeon, and/or XScale; and/or the like processor(s).

A "memory" may be any suitable device or devices that can store electronic data. A suitable memory may comprise a non-transitory computer-readable medium that stores instructions that can be executed by a processor to implement a desired method. Examples of memories may comprise one or more memory chips, disk drives, etc. Such memories may operate using any suitable electrical, optical, and/or magnetic mode of operation.

A "distributed ledger" may include a database that is shared among multiple nodes across a network. Entities corresponding to each node may store identical copies of the ledger at a given time. The entities may have permission to make changes or additions to the ledger. When the ledger is changed, the participating entities may receive the updated ledger. An example of a distributed ledger can include a blockchain, wherein transactions are verified before being recorded to the blockchain in a block of transactions.

"Identity information" may include information that can be used to identify an entity. Some identity information may be information that is uniquely associated with an entity, such as an address, a tax identifier, a driver's license number, etc. Some identity information may be information that secret and known only by entity and/or a few entities, such as a social security number, a PIN, etc.

"Verification" may include establishing the truth, accuracy, or validity of something. Verification can include confirming that an entity is who they say they are. Verification may also include assessing the accuracy of information. In order to verify an entity, identity information about the entity may be verified.

A "verification request message" may be a message requesting verification of a user. The verification request message may be sent by an authorizing entity during a verification process to a server computer. A verification request message may include information about the user that is to be verified, in plaintext or as hashed data. The verification request message may also include an identifier of the user that is to be verified.

A "verification response message" may be a message with a response to a verification request message. The verification response message may include verification data (e.g., a cryptogram) that indicates that an entity is verified. The verification response message may alternatively indicate that the entity is not verified. The verification response message may be sent by a server computer to an authorizing entity computer.

A "hash" may be the output of a hashing function. A hash may be a piece of data (e.g., a string) of fixed size (e.g., 256 bits). In some embodiments, a hash may refer to a collection of hashed data. For example, a name, age, and address may be hashed separately to form a hashed name, a hashed age, and a hashed address. The hashed name, hashed age, and hashed address may be referred to collectively as a "hash" in some circumstances.

An "indication of a hash" may be an indicator of a hash. The indication may be that a hash was generated and/or that the hash was stored in a database. Examples of an indication may include a digital signature or cryptogram using a cryptographic key held by an authorizing entity computer. The indication of a hash may also include a location of the hash in the database.

FIG. 1 is a block diagram of a system 100 according to embodiments. For simplicity of illustration, a certain number of components are shown in FIG. 1. It is understood, however, that embodiments of the invention may include more than one of each component. In addition, some embodiments of the invention may include fewer than or more than all of the components shown in FIG. 1. For example, embodiments of the invention may have more than two authorizing entity computers and more than two shared databases.

The system 100 may comprise a user device 120, first and second authorizing entity computers 110A, 110B, a server computer 140, and a location database 145. The first and second authorizing entity computers 110A, 110B may be associated with first and second verification databases 115A, 115B and first and second shared databases 135A, 135B, respectively. Each database may be a conventional, fault tolerant, relational, scalable, secure database such as those commercially available from Oracle™ or Sybase™. In some embodiments, any of the databases may be combined into a single database, or may be separated into multiple databases.

The user device 120, the first and second authorizing entity computers 110A, 110B, the first and second verification databases 115A, 115B, the first and second shared databases 135A, 135B, the server computer 140, and the location database 145 may all be in operative communication with each other through any suitable communication channel or communications network. Suitable communications networks may be any one and/or the combination of the following: a direct interconnection; the Internet; a Local Area Network (LAN); a Metropolitan Area Network (MAN); an Operating Missions as Nodes on the Internet (OMNI); a secured custom connection; a Wide Area Network (WAN); a wireless network (e.g., employing protocols such as, but not limited to a Wireless Application Protocol (WAP), I-mode, and/or the like); and/or the like. Messages between the computers, networks, and devices may be transmitted using a secure communications protocols such as, but not limited to, File Transfer Protocol (FTP), Hypertext Transfer Protocol (HTTP), Secure Hypertext Transfer Protocol (HTTPS), Secure Socket Layer (SSL), ISO (e.g., ISO 8583) and/or the like.

The user device 120 may be operated by a user (not shown). The user may be an individual, a business, or another entity. The user device 120 may store identity information about the user. Examples of identity information may include a social security number, an address, a tax identifier, a driver's license number, etc. The user device 120 may also store an identifier of the user (e.g., a name, an identification number).

The first and second authorizing entity computers 110A, 110B can verify information about the user received from the user device 120. The authorizing entity computers 110A-B may perform verification processes and may authorize requests from users that have been verified. The first and second authorizing entity computers 110A, 110B may be operated by authorizing entities such as government agencies, banks, and/or businesses.

The first authorizing entity computer 110A may have or be in communication with a first verification database 115A and the second authorizing entity computer 110B may have or be in communication with a second verification database 115B. The verification databases 115A, 115B may store verified information about the user, including verified identity information. The first and second verification databases 115A and 115B may also store indications that users are verified. Indications of user verification may include, but are not limited to cryptograms, verification dates, digital signatures, etc. The first and second verification databases 115A, 115B may be physically and/or logically separated from shared databases 135A, 135B. For example, each database may be on separate physical computers physically remote from each other.

The server computer 140 may manage verification processes and/or can facilitate interactions between verification processes. In some embodiments, the server computer 140 may be part of a payment processing network. The server computer 140 may also be part of a verification service.

The server computer 140 may share a shared database 135A, 135B with an authorizing entity computer 110A, 110B. For example, the server computer 140 may share the first shared database 135 with the first authorizing entity computer 110A. The server computer 140 may also share the second shared database 135B with the second authorizing entity computer 110B. Each shared database 135A, 135B may store hashed identity information from users. First and second authorizing entity computers 110A and 110B may be able to write data to the first and second shared databases 135A and 135B, respectively. For example, first authorizing entity computer 110A may be able to write data to first shared database 135A but not have access to second shared database 135B. Access to the first and second shared databases 135A, 135B by outside entities can be based on permissioned access.

The shared databases may have any suitable characteristics. For example, each shared database 135A, 135B may have a shared database identifier. In some embodiments, the shared database 135A and/or 135B may include a distributed ledger (e.g., a blockchain). The shared databases 135A, 135B, and the server computer 140 and the associated authorizing entity computer 110A and/or 110B may be nodes in a distributed ledger system in some embodiments.

The server computer 140 may have or may be in communication with location database 145. The location database 145 may store locations in the shared databases 135A, 135B of hashed identity information about the user. Locations may include row numbers, pointers, database keys, etc. In some embodiments, the location database 145 can also store trust scores about authorizing entity computers 110A-B. The location database 145 may be separate and distinct from the first and second shared databases 135A, 135B.

Figure 2:
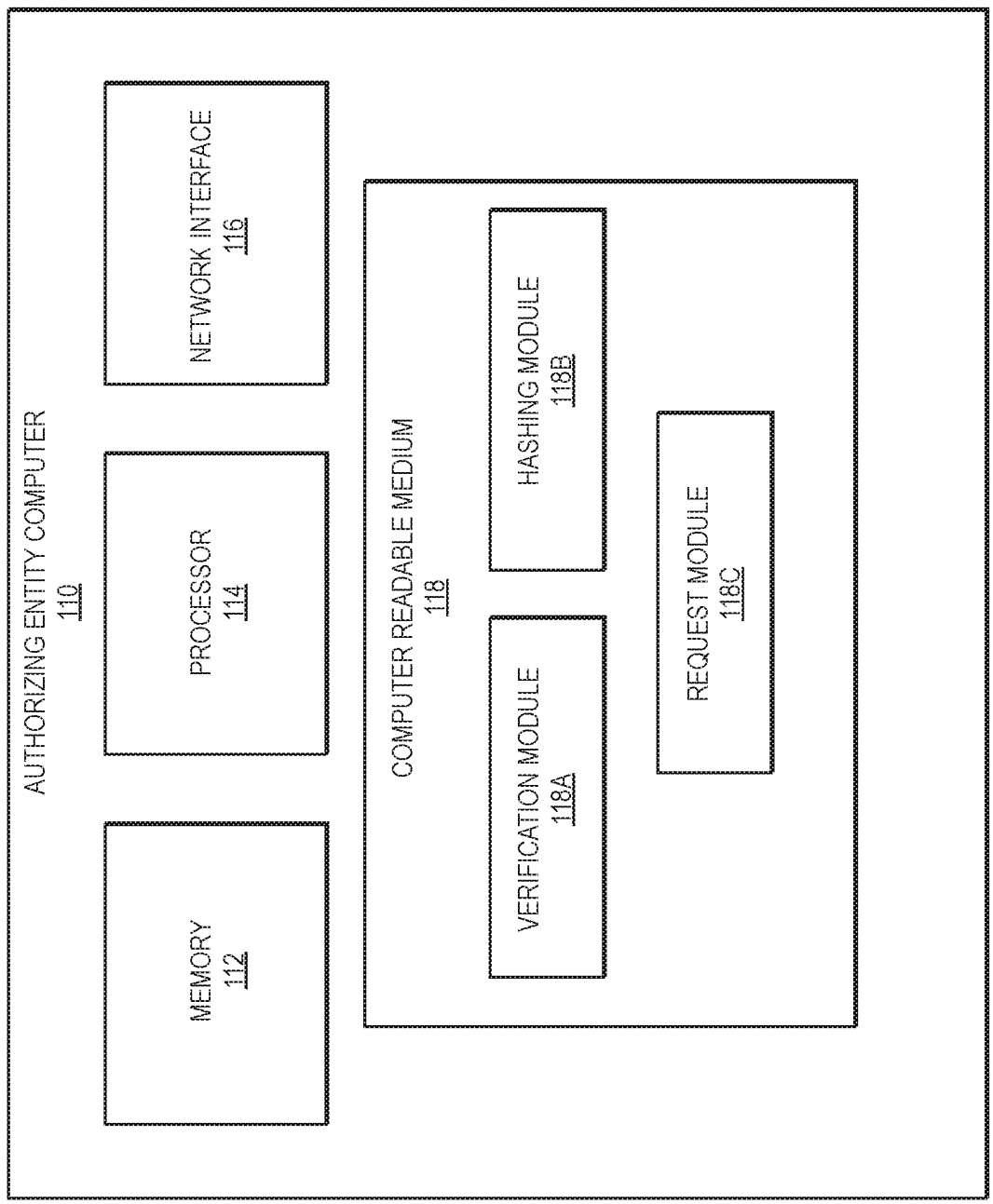
FIG. 2 shows a block diagram of an authorizing entity computer according to embodiments.

FIG. 2 shows a block diagram of authorizing entity computer 110. Authorizing entity computer 110 may be representative of the previously described first authorizing entity computer 110A or second authorizing entity computer 110B. The authorizing entity computer 110 may comprise a memory 112, a processor 114, a network interface 116, and a computer-readable medium 118. Computer-readable medium 118 may store code executable by the processor 114 for implementing some or all of the functions of authorizing entity computer 110 described herein. The computer-readable medium 118 may include a verification module 118A, a hashing module 118B, and a request module 118C.

The memory 112 may be implemented using any combination of any number of non-volatile memories (e.g., flash memory) and volatile memories (e.g., DRAM, SRAM), or any other non-transitory storage medium, or a combination of media.

The processor 114 may be implemented as one or more integrated circuits (e.g., one or more single core or multicore microprocessors and/or microcontrollers). The processor 114 may be used to control the operation of the authorizing entity computer 110. The processor 114 can execute a variety of programs in response to program code or computer-readable code stored in memory 112. The processor 114 may include functionality to maintain multiple concurrently executing programs or processes.

The network interface 116 may be configured to connect to one or more communication networks to allow authorizing entity computer 110 to communicate with other entities such as a user device 120, a server computer 140, etc. For example, communication with the server computer 140 can be direct, indirect, and/or via an API. Some examples of network interface 116 may include a modem, a physical network interface (such as an Ethernet card or other Network Interface Card (NIC)), a virtual network interface, a communications port, a Personal Computer Memory Card International Association (PCMCIA) slot and card, or the like. The wireless protocols enabled by network interface 116 may include Wi-Fi™.

The verification module 118A, in conjunction with the processor 114, can verify information about users. The verification module 118A, in conjunction with the processor 114, can receive identity information about a user (e.g., an address, a driver's license number), and then determine sources to verify the identity information. For example, the verification module 118A may determine a state government that can verify a driver's license number about a user based on the format of the number. The verification module 118A, in conjunction with the processor 114, may determine if the user can be verified based on the information. For example, the verification module 118A, in conjunction with the processor 114, may determine that the user can be verified because 95% of the information provided by the user has been verified by trusted sources. The verification module 118A, in conjunction with the processor 114, may also generate an indication that the user has been verified. For example, the verification module 118A and the processor 114 may generate a digital signature or cryptogram using a cryptographic key held by the authorizing entity computer 110 as proof that a user has been verified.

The hashing module 118B, in conjunction with the processor 114, can hash information. The hashing module 118B, in conjunction with the processor 114, may use a cryptographic hashing algorithm (e.g., SHA-256). The hashing module 118B, in conjunction with the processor 114, may use different hashing algorithms for different types of identity information. For example, an address and a social security number may be hashed to strings of different length.

The request module 118C, in conjunction with the processor 114, may generate verification request messages. A verification request message may comprise an identifier of a user (e.g., a user name) and hashed identity information received from a user device 120. The verification request message may also indicate a type of the identity information. For example, "1" may indicate a "name," "2" may indicate a social security number, etc. The request module 118C, in conjunction with the processor 114, may also send the verification request message to an external computer such as the previously described server computer 140.

Figure 3:
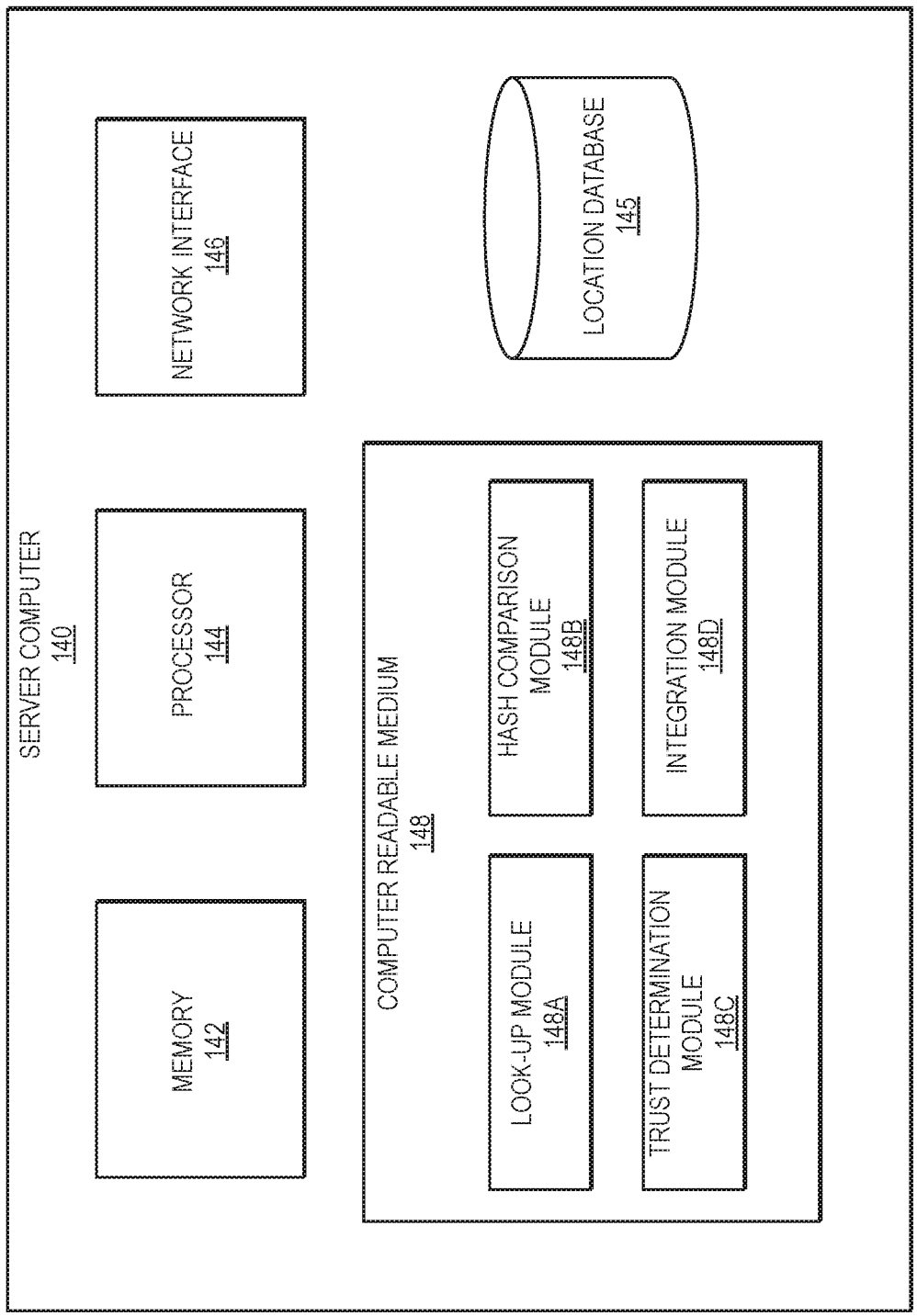
FIG. 3 shows a block diagram of a server computer according to embodiments.

FIG. 3 shows a block diagram of server computer 140 according to an embodiment. The server computer 140 may comprise a memory 142, a processor 144, a network interface 146, and a computer-readable medium 148. These components may be similar to or different than the corresponding components in the authorizing computer 110 FIG. 2 Computer-readable medium 148 may store code executable by the processor 144 for implementing some or all of the functions of server computer 140 described herein. For example, computer-readable medium 148 may include a look-up module 148A, a hash comparison module 148B, a trust determination module 148C, and a integration module 148D. The server computer 140 may also include or be in communication with a location database 145.

The look-up module 148A, in conjunction with the processor 144, may look up hashed identity information about a user. The look-up module 148A, in conjunction with the processor 144, can use a user identifier to determine a location of a hash of information from the location database 145. The look-up module 148A, in conjunction with the processor 144, may also determine the shared database where one or more hashes are stored. The look-up module 148A, in conjunction with the processor 144, can then use the location obtained from the location database 145 to retrieve a hash from a shared database 135A-B. In some embodiments, the look-up module 148A, in conjunction with the processor 144, may determine whether to retrieve a plurality of hashes from a plurality of shared databases. For example, the look-up module 148A, in conjunction with the processor 144, may determine that hashes of the address of the user are in multiple shared databases associated with different authorizing entities. As another example, the look-up module 148A, in conjunction with the processor 144, may determine that a plurality of shared databases contain hashes of different types of identity information about the user (e.g., a hashed address may be in one shared database and a hashed tax ID may be in another, different shared database).

The hash comparison module 148B, in conjunction with the processor 144, may compare hashed identity information. The hash comparison module 148B may receive hashed identity information from a verification request message and verify it against hashed identity information from a shared database. For example, it may compare received hashed identity information with stored hashed identity information, and then verify that the received hashed identity information is authentic. The hash comparison module 148B, in conjunction with the processor 144, may generate verification data based in the result of the hash comparison. Examples of verification data may include a cryptogram or code indicating that the hashed identity information matches the verified hashed identity information.

The trust determination module 148C may determine trust scores for authorizing entities which may interact with a user. A trust score may indicate the strength of a verification process performed by an authorizing entity. As an example, the trust score may be a score between 0 and 1, where a higher value indicates a more rigorous (and therefore trustworthy) verification process. The trust score may depend on, for example, the identity of the authorizing entity, the number of users that the authorizing entity is associated with, the amount of information that has been verified by the authorizing entity, and the number of verification request messages sent by the authorizing entity. For example, a large authorizing entity that verifies thousands of users each day may receive a trust score of 0.95 while an authorizing entity that has only verified a few entities may receive a trust score of 0.45. The trust score may also depend on the method by which the authorizing entity verifies information. For example, a government agency that verifies information about a user by comparing the information with government records may receive a high trust score. Alternatively, a company that verifies information about a user using a social media profile of the user may receive a low trust score. The trust determination module may store a trust score for each authorizing entity. In some embodiments, the trust score may be stored in the location database 145.

The integration module 148D, in conjunction with the processor 144, may integrate information of the hash comparison module 148B and the trust determination module 148C to verify the user. The integration module 148D, in conjunction with the processor 144, can make a determination about verifying the user. For example, if the hash comparison module 148B determines that hashed identity information matches verified hashed identity information from a first authorizing entity computer 110A, and the trust determination module 148C determines a high trust score for the first authorizing entity, then the integration module 148D, in conjunction with the processor 144, can determine that the user is verified. Alternatively, the integration module 148D may determine that the user is not verified if the hashes do not match and/or the authorizing entity has a low trust score.

A method according to one embodiment of the invention may be described with respect to FIG. 1. In step S102, the user may initiate a verification process with a first authorizing entity operating the first authorizing entity computer 110A. In initiating the verification process, the first authorizing entity computer 110A may receive identity information about a user from a user device 120. The user may be, for example, an individual or a business and the first authorizing entity computer 110A may be operated by, for example, an authorizing entity such as a government agency or a bank. In a specific example, the user may be a person seeking to open an account at a bank that operates the first authorizing entity computer 110A. The information sent by the user device 120 may include identity information (e.g., a social security number, a tax identifier, an address). The user device 120 may also send an identifier of the user (e.g., an ID number, a name). The identifier of the user may be separate from the identity information and may allow the user to be identified during the verification process without using sensitive identity information.

In step S104, the first authorizing entity computer 110A may verify the identity information from the user device 120. The identity information may be verified by the first authorizing entity computer 110A using a verification processes, such as a KYC (know your customer) process. For example, the first authorizing entity computer 110A can compare the identity information to legal documents or government records from an external data source (e.g., a government database). After verifying the identity information, the first authorizing entity computer 110A can store the verified identity information in a first verification database 115A. The verified identity information may be stored in the first verification database 115A in plaintext or may be encrypted with an encryption key known to the first authorizing entity computer 110A. In some embodiments, the first authorization entity computer 110A may store a hash of the verified identity information, such as a hash generated in step S106.

In step S106, the first authorizing entity computer 110A may hash the verified identity information to generate a first hash. The first authorizing entity computer 110A may generate the first hash using a hashing function, in particular a cryptographic hashing function (e.g., SHA-256) to hash the verified identity information. The first authorizing entity computer 110A may then store the first hash in the first shared database 135A. The first hash may be stored with the identifier of the user at a location in the shared database 135A. The location may be, for example, a memory pointer, a database key, or a row number. In some embodiments, the first authorizing entity computer 110A may also send the first hash to the server computer 140.

In step S108, the server computer 140 may receive an indication of the first hash of identity information about the user. The indication may be a notification that the first hash has been stored in the first shared database 135A by the first authorizing entity computer 110A. In some embodiments, the indication may be received from the first authorizing entity computer 110A. In other embodiments, the indication may be received from the first shared database 135A (e.g., the server computer 140 may receive a notification whenever the first shared database 135A is modified). The indication may also include a location of the first hash in the first shared database 135A. For example, the location may be a row number, pointer, or database key. Alternatively, the server computer 140 may determine the location of the first hash in the first shared database 135A, for example, by identifying recently added information in the first shared database 135A.

The server computer 140 may also receive the first hash directly from the first authorizing entity computer 110A. The server computer 140 may also receive the identifier of the user. The server computer 140 may then store the location of the first hash in the first shared database 135A in a location database 145, with the identifier of the user. The server computer 140 may also store a trust score for the first authorizing entity 110A in the location database 145. The first shared database 135A may be separate and distinct from the location database 145. For example, the first database 135A and the location database 145 may be on separate computers.

In step S110, the second authorizing entity computer 110G may receive identity information about the user from the user device 120. The user device 120 may also send the identifier of the user to the second authorizing entity computer 110G. The identity information that the user device 120 sends to the second authorizing entity computer 110G may be the same identity information that the user device 120 sent to the first authorizing entity computer 110A. Additionally, or alternatively, there may be information that the user device 120 sends to the second authorizing entity computer 110G that was not sent to the first authorizing entity computer 110A, and vice versa. For example, the user device 120 may send a driver's license number and an address to the first authorizing entity computer 110A, and a social security number and the address to the second authorizing entity computer 110G. The identity information sent by the user device 120 may depend on requirements set by each authorizing entity.

As an illustration, the user may wish to open a second banking account at a second bank operating the second authorizing entity computer 110G. The information needed to open the second banking account may be similar to the information needed to open the first banking account at the first bank operating the first authorizing entity computer 110A.

In step S112, the second authorizing entity computer 110G may hash the identity information to generate a second hash. The second authorizing entity computer 110G may hash the identity information from the user device 120 using the same hashing function as the first authorizing entity computer 110A. For example, the second authorizing entity may use SHA-256. In some embodiments, the second authorizing entity computer 110B may then store the second hash in the second shared database 135B.

In step S114, the second authorizing entity computer 110B may send a verification request message about the user to the server computer 140, requesting that the server computer 140 verify the information from the user device 120. The verification request message may include the second hash. The verification request message may also include the identifier of the user, and the types of identity information in the verification request message (e.g., an "address" type).

In step S116, after receiving the verification request message about the user, the server computer 140 may retrieve the location of the first hash of identity information about the user from the location database 145. The server computer 140 may use the identifier of the user to retrieve the location of the first hash. In some embodiments, there may be a plurality of hashes of information about the user stored in a plurality of shared databases. Then the server computer 140 may retrieve a plurality of locations of hashes from the location database 145. For example, the server computer 140 may retrieve locations of hashes for a user with an "address" type in response to receiving a hashed address from the second authorizing entity computer 110B. Alternatively, the server computer 140 may retrieve a specific location of a hash of information about the user from the location database 145. For example, the server computer 140 may retrieve the most recent location, or the location of a hash in a shared database of an authorizing entity with the highest trust score.

In step S118, the server computer 140 may retrieve the first hash from the first shared database 135A using the location of the first hash. In some embodiments, the server computer 140 may retrieve a plurality of hashes from a plurality of shared databases. For example, the server computer 140 may retrieve a hashed address associated with the user from 3 different shared databases. In some embodiments, the first authorizing entity computer 110A may learn that the server computer 140 is retrieving data from the first shared database 135A but may not learn what data the server computer 140 is retrieving.

In step S120 the server computer 140 may compare the first hash to the second hash to determine if the first hash and the second hash match. In some embodiments, the server computer 140 may compare the second hash to a plurality of hashes to determine if the second hash matches one or more hashes in the plurality of hashes. The first hash and the second hash may match if the they are derived from the same information. Two pieces of information that differ slightly may have significantly different hashes, so the server computer 140 may enforce standards for information to ensure that hashes can be easily compared (e.g., formatting standards, encoding standards). The server computer 140 may also evaluate the trust score of the first authorizing entity computer 110A when comparing the first hash to the second hash. For example, if the first authorizing entity computer 110A has a low trust score, the server computer 140 may determine that the first hash and the second hash do not match even if the hashes are the same. The server computer may also compare the trust score of the first authorizing entity computer 110A to a threshold to determine if the first authorizing entity computer 110A has a low trust score. Alternatively, the server computer 140 may determine that the first hash and the second hash match but may not verify the user.

In step S122, if the server computer 140 determines that the first hash and the second hash match, the server computer 140 may generate verification data (e.g., a cryptogram) indicating that the user was previously verified by an authorizing entity. The verification data may also indicate that the trust score of the first authorizing entity computer 110A was greater than the threshold. The server computer 140 may send a verification response message, comprising the verification data, to the second authorizing entity computer 110B. In some embodiments, the verification response message may not indicate which particular authorizing entity previously verified the user. The second authorizing entity computer 110B may then store the identity information from the user device 120 in a second verification database 115B with an indication that the user has been verified. The indication may be the verification data. The second authorizing entity computer 110B may also store the second hash in the second shared database 135B. In some embodiments, if the second hash is already stored in the second shared database 135B, the second authorizing entity computer 110B may update the second hash with the indication that the user associated with the second hash has been verified.

Once the user has been verified, the second authorizing entity operating the second authorizing entity computer 110B can provide the requested access or service that was requested by the user that interacted with the second authorizing entity.

Figure 4:
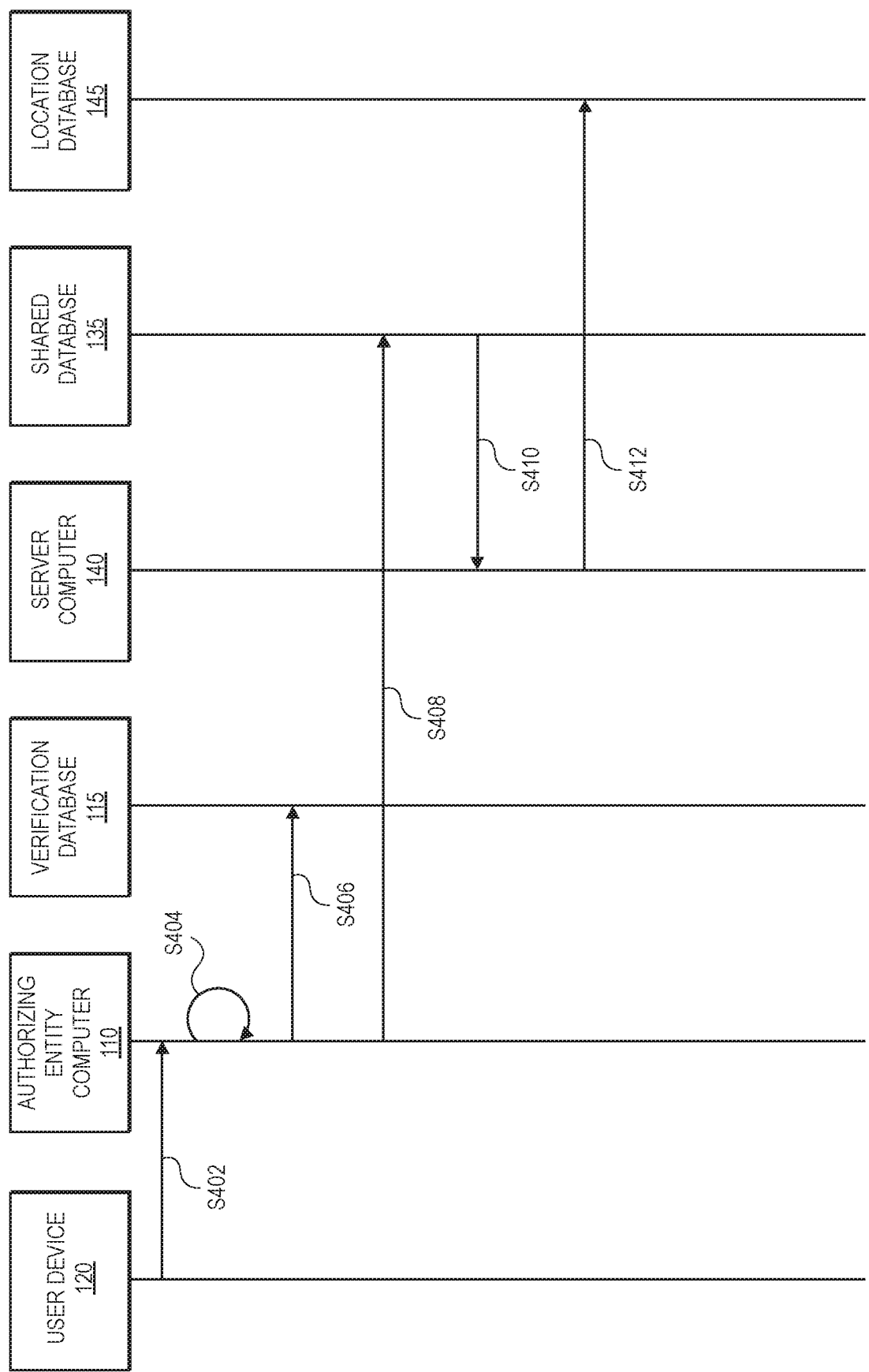
FIG. 4 shows a swim lane diagram of information verification and storage according to embodiments.

FIG. 4 shows a swim lane diagram of information verification and storage according to embodiments. Authorizing entity computer 110 may be the first authorizing entity computer 110A of FIG. 1, verification database 115 may be the first verification database 115A, and the shared database 135 may be the first shared database 135A.

In step S402, a user may use user device 120 to initiate a verification process with an authorizing entity computer 110. The verification process may be, for example, a Know Your Customer (KYC) process. In initiating the verification process, the user device 120 may send a request for verification to the authorizing entity computer 110. The request for verification may comprise identity information (e.g., an address, a tax ID) and an identifier of the user (e.g., a name, an ID number). The identity information in the request for verification may be information that is independently verifiable by the authorizing entity computer 110.

In step S404, the authorizing entity computer 110 may verify the identity information from the user device 120 using the verification process. For example, if the user device 120 sent an address, the authorizing entity computer 110 may look up the address to determine if the address is accurate and if the user resides at or operates out of that address. As another example, the authorizing entity computer 110 may confirm identity information with government and legal entities such as a department of motor vehicles or court records. If the authorizing entity computer 110 is not able to verify some or all of the identity information from the user device 120, the authorizing entity computer 110 may terminate the verification process. If the authorizing entity computer 110 is able to verify the identity information from the user device 120, the authorizing entity may verify the user.

In step S406, the authorizing entity computer 110 may store the verified identity information in a verification database 115. The verification database 115 may also store an indication that the user is verified. The verification database 115 may also store an indication that the user has been verified (e.g., a cryptogram, a date of the verification, etc.).

In step S408, the authorizing entity computer 110 may hash the verified identity information from the user device 120. The authorizing entity computer 110 may hash the identity information using a cryptographic hashing algorithm (e.g., SHA-256). The authorizing entity computer 110 may then store the hash of the identity information in a shared database 135. The shared database 135 may be shared with server computer 140. The server computer 140 may not be able to edit the information in the shared database 135. In some embodiments, the shared database 135 may be a distributed ledger. The authorizing entity computer 110 and the server computer 140 may be nodes in the distributed ledger. The authorizing entity computer 110 may store the hash with the identifier of the user and/or the type of the information. For example, the authorizing entity computer 110 may include that a hash is a hashed address. In some embodiments, the authorizing entity computer 110 may also send a notification to the server computer 140 that the hash has been stored in the shared database 135. In other embodiments, the shared database 135 may send an indication to the server computer 140 that the hash has been stored in the shared database 135.

In step S410, the server computer 140 may receive an indication that the hash has been stored in the shared database 135. The server computer 140 may receive the indication from the authorizing entity computer 110 or the shared database 135. For example, the server computer 140 may receive a notification whenever data is added to the shared database 135. If the shared database 135 is a distributed ledger, the server computer 140 may receive an indication that the hash has been stored in the shared database 135 when reaching consensus about the update to the distributed ledger. The indication may include a location of the hash in shared database 135. Additionally, or alternatively, the server computer 140 may receive the hash.

In step S412, the server computer 140 may store the location of the hash in the shared database 135 in a location database 145. The location database 145 may also have the identifier of the user. The location database 145 may also store the type of the information. The shared database 135 may be separate and distinct from the location database 145. For example, the shared database 135 and the location database 145 may be stored on separate computers.

In some embodiments, the server computer 140 may calculate a trust score for the authorizing entity computer 110. The server computer 140 may determine the trust score at any point in the verification process. For example, the server computer 140 may determine the trust score after receiving an indication of a hash, or after gaining access to a shared database 135. The trust score may be based on the verification process done by the authorizing entity computer 110. For example, a strong verification process may involve the authorizing entity computer verifying information with multiple sources, and using quality sources like government entities. The server computer may then determine a high trust score for the authorizing entity. The authorizing entity may alternatively have a weak verification process. For example, the authorizing entity may use low quality sources, such as a social media profile, to verify identity information. The authorizing entity computer 110 may then have a low trust score. In order to determine a trust score the authorizing entity computer 110 may send information to the server computer 140 about how the verification process, for example, when sending the notification about the hash. In some embodiments, the server computer 140 can audit the authorizing entity computer 110 to analyze the verification process. The server computer 140 may also periodically audit the authorizing entity computer 110 to maintain an updated trust score for the authorizing entity computer 110. The server computer 140 may then store the trust score in the location database 145.

Figure 5:
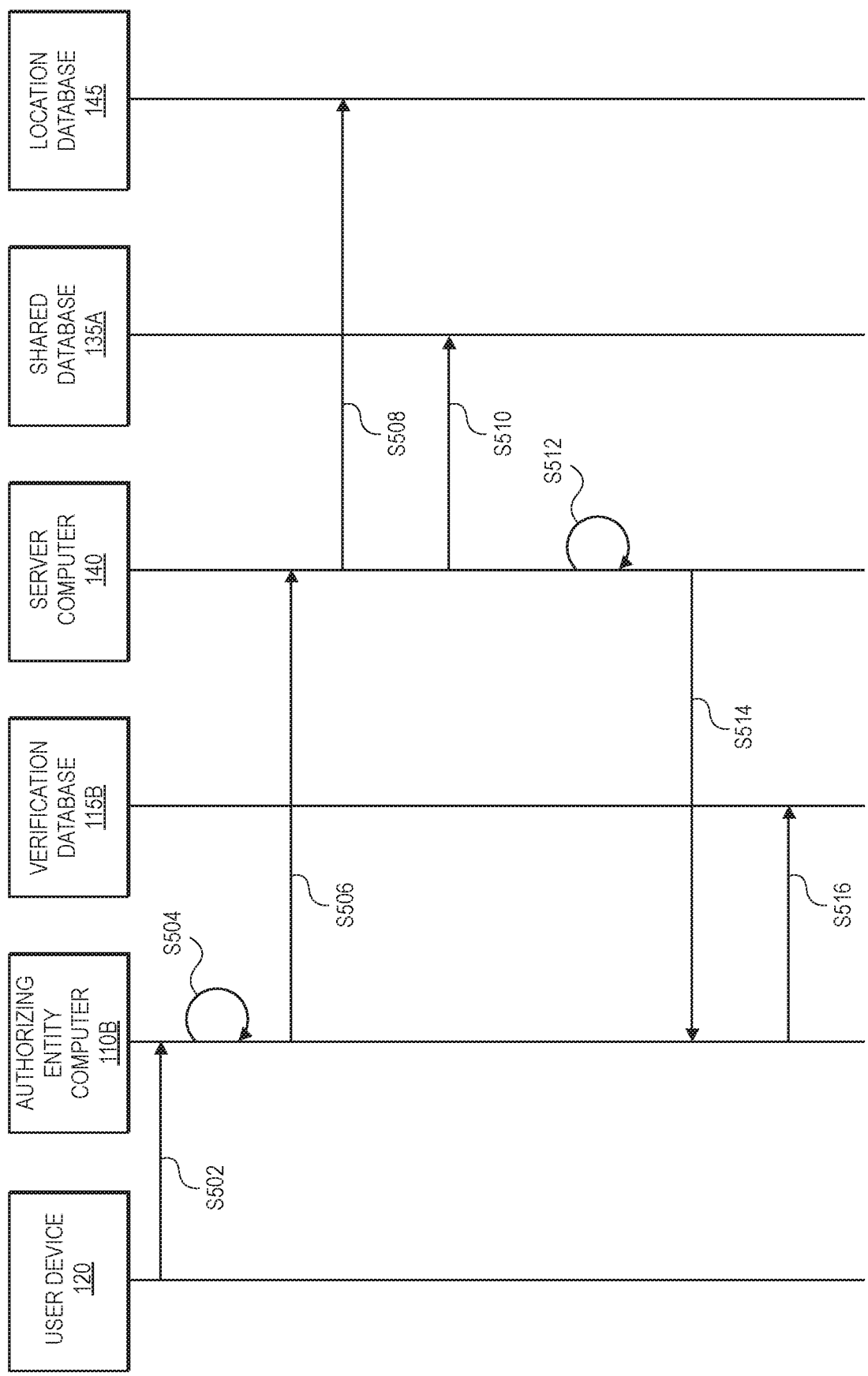
FIG. 5 shows a swim lane diagram of information retrieval according to embodiments.

FIG. 5 shows retrieval of verified information according to embodiments. The authorizing entity computer 110B may be the second authorizing entity computer 110B of FIG. 1. The verification database 115B may be second verification database 115B of FIG. 1. The user may have previously completed a verification process with a first authorizing entity computer 110A, and a first hash of identity information may have been stored in shared database 135A, following the method of FIG. 4.

In step S502, a user may use a user device 120 to initiate a verification process with an authorizing entity. The verification process may be, for example, a Know Your Customer (KYC) process. In initiating the verification process, the user device 120 may send a request for verification to the authorizing entity computer 110B. The request for verification may comprise identity information (e.g., an address, a tax ID) and an identifier of the user (e.g., a name, an ID number). The identity information in the request for verification may be information that is independently verifiable by the authorizing entity computer 110.

In step S504, the authorizing entity computer 110B may hash the identity information from the user device 120 to generate a second hash. The authorizing entity computer may use the same hashing function as the first authorizing entity computer 110A. For example, the authorizing entity computer 110B may use a cryptographic hashing algorithm such as SHA-256.

In step S506, the authorizing entity computer 110B may send a verification request message to the server computer 140. The verification request message may comprise include the second hash. The verification request message may also include the identifier of the user, and the types of identity information in the verification request message (e.g., an "address" type).

In step S508, the server computer 140 may receive the verification request message from the authorizing entity computer 110B. The server computer 140 may then retrieve from a location database 145 a location of a first hash of the identity information in a shared database 135A. The server computer 140 may use the identifier of the user to retrieve the location from the location database 145. In some embodiments, the server computer 140 may retrieve a plurality of locations from a plurality of shared databases. The server computer 140 retrieve locations of hashes that have the same type of information. For example, the server computer 140 may retrieve the locations of all hashes of addresses associated with the user. If there are hashes from multiple shared databases, the server computer 140 can use a trust score to select a location in a particular shared database. For example, the server computer 140 may only retrieve the location from the shared database of an authorizing entity with the highest trust score, or with a trust score above a threshold.

In step S510, the server computer 140 may retrieve the first hash of the information from the shared database 135A using the location of the first hash. The server computer 140 may also retrieve a plurality of hashes from a plurality of shared databases. For example, the server computer 140 may retrieve a hashed address associated with the user from 3 different shared databases. In some embodiments, the first authorizing entity computer 110A may learn that the server computer 140 is retrieving data from the first shared database 135A but may not learn what data the server computer 140 is retrieving.

In step S512, the server computer 140 can compare the first hash to the second hash to determine if the hashes match. In some embodiments, the server computer 140 may compare the second hash to a plurality of hashes to determine if the second hash matches one or more hashes in the plurality of hashes. In some embodiments, the server computer 140 may compare the second hash to hashes from a plurality of shared databases. For example, the second hash may include a hash of an address and a hash of a social security number. The first hash may include a hash of an address and a hash from an additional shared database may include a hash of a social security number.

The first hash and the second hash may match if the they are derived from the same information. Two pieces of information that differ slightly may have significantly different hashes, so the server computer 140 may enforce standards for information to ensure that hashes can be easily compared (e.g., formatting standards, encoding standards). The server computer 140 may also evaluate the trust score of the first authorizing entity when comparing the first hash to the second hash. For example, if the first authorizing entity has a low trust score, the server computer 140 may determine that the first hash and the second hash do not match even if the hashes are the same. As another example, the server computer 140 may determine if the trust score of the first authorizing entity is above a predetermined threshold before comparing the first hash and the second hash. Alternatively, the server computer 140 may determine that the first hash and the second hash match but may not verify the user.

In step S514, after determining that the first hash matches the second hash, the server computer 140 may generate verification data (e.g., a cryptogram) indicating that the user was previously verified. The server computer 140 may then generate a verification response message comprising the verification data and send the verification response message to the authorizing entity computer 110B. Additionally, the verification response message may comprise information about the verification, such as the trust score of the first authorization entity. The server computer 140 may not send to the authorizing entity computer 110B information about which authorizing entity originally verified the user. If the server computer 140 as not able to match the hashes, the server computer 140 may send to the authorizing entity computer 110B a verification response message with an indication that the user is not verified.

In step S516, if the verification response message indicates that the user is verified, then the authorizing entity computer 110B may store the identity information about the user in a verification database 115B, and may also store the verification data in the verification database 115B. The authorizing entity computer 110B may also store the second hash of the identity information in a second shared database 135B. When the authorizing entity computer 110B stores the hash in the second shared database 135B, the authorizing entity computer 110B may also send an indication of the second hash to the server computer 140.

Figure 6:
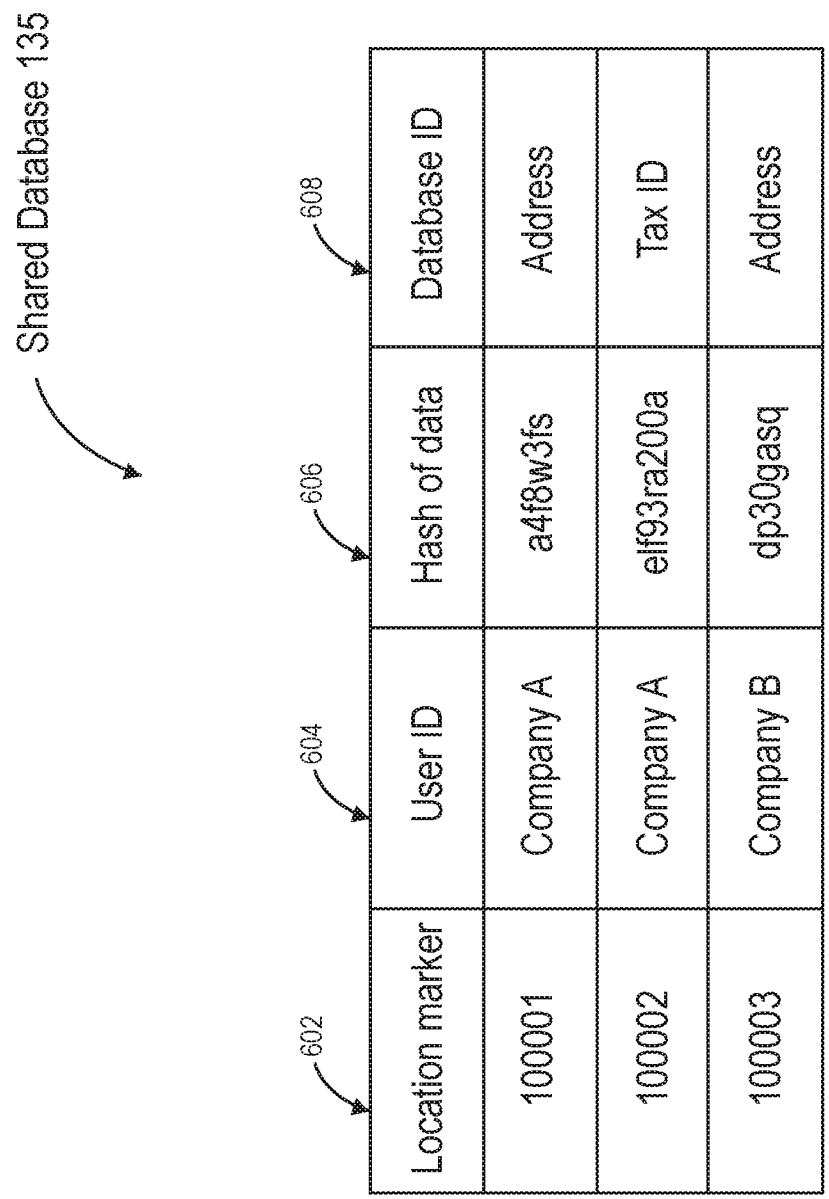
FIG. 6 shows an exemplary shared database according to embodiments.

FIG. 6 shows entries in a shared database 135, such as first shared database 135A of FIG. 1. The shared database 135 may be, for example, a distributed ledger or a relational database shared between multiple computers. While the data in FIG. 6 is shown as a table with columns, it is appreciated that the information may be stored and displayed in any suitable format.

The shared database 135 may comprise location markers 602. The location marker may be, for example, a sequentially numbered reference for the row in the database or a reference to a memory location in the shared database 135.

The shared database 135 may also comprise user identifiers 604. The user identifier may be the name of the user. For example, two users may be Company A and Company B. In another example, the user identifier may be a unique identifier for the user, such as an alphanumeric code.

The shared database 135 may also comprise hashes 606. The hash may be generated with a public hashing function, such as a cryptographic hashing function. In some embodiments, different types of identity information may be hashed differently. For example, addresses may hash to an 8-character alphanumeric string while tax IDs may hash to an 11-character alphanumeric string. Note that simple hashes are shown for purposes of illustration, but longer hashes may be used in embodiments.

The shared database 135 may also comprise types of information 608. For example, Company A may have sent an address and a tax ID to be verified, while Company B may have only sent an address. In some embodiments, the information type may be derivable from the form of the hash.

Figure 7:
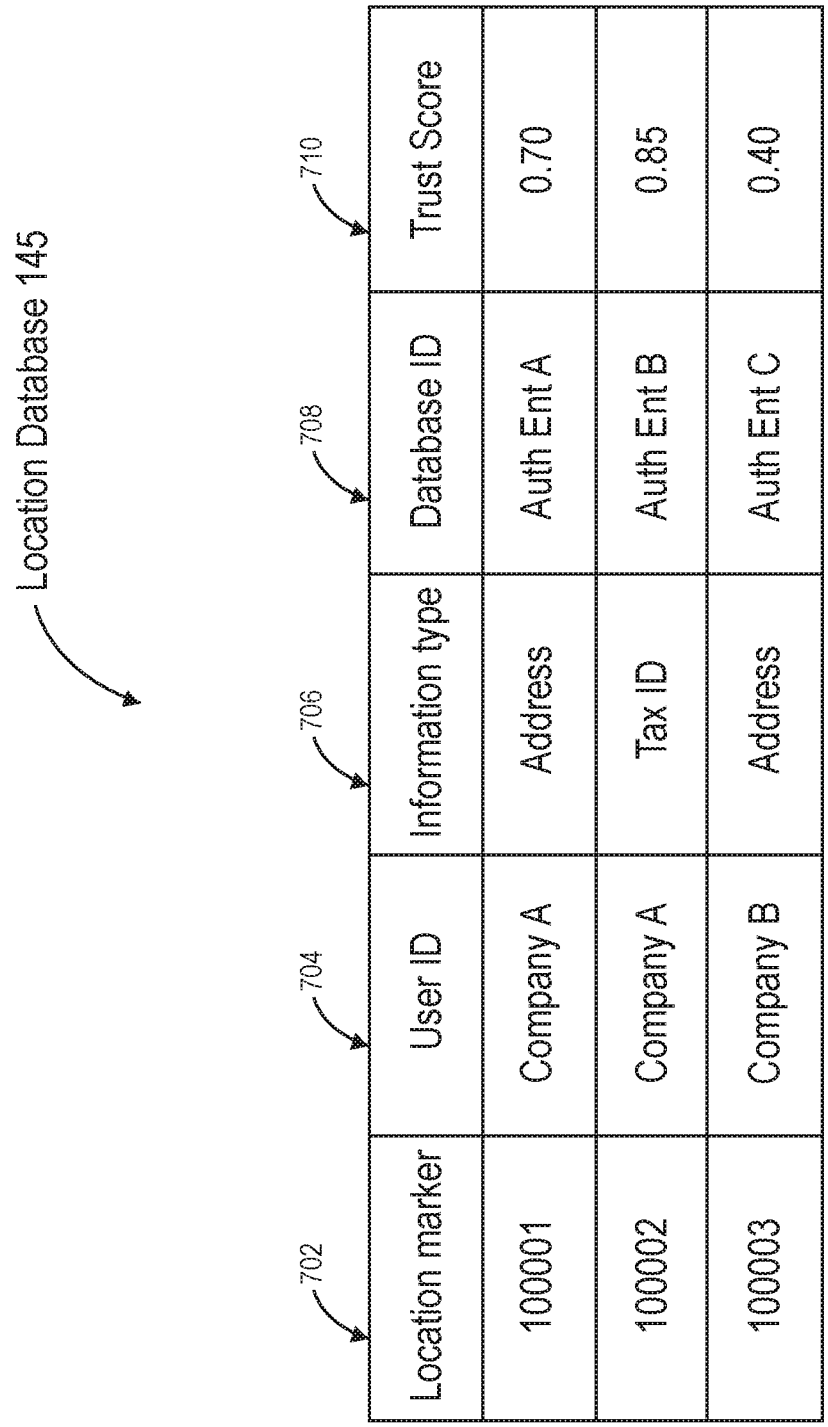
FIG. 7 shows and exemplary location database according to embodiments.

FIG. 7 shows entries of a location database, such as location database 145 of FIG. 1. While the data in FIG. 7 is shown as a table with columns, it is appreciated that the information may be stored and displayed in any suitable format.

The location database 145 may comprise location markers 702. The location markers may be received from shared databases (e.g., location markers 602 of FIG. 6), and may point to a location in each shared database. Each shared database may use a different location marker scheme (e.g., one may use row numbers and one may use memory pointers). The location database 145 may also comprise user identifiers 704 which may be user identifiers 604 from FIG. 6. The location database 145 may also comprise types of information 706 which may be types of information 606 from FIG. 6.

The location database 145 may also comprise identifiers of shared databases 708. The shared database identifier may be an identifier of the authorizing entity or authorizing entity computer associated with the shared database. Alternatively, each shared database may have an individual identifier.

The location database 145 may also comprise trust scores 710. The trust scores may be determined by a trust score determination module of a server computer and may indicate the strength of an authorizing entity's verification process. For example, the trust score may be a number between 0 and 1, or 0 and 100, with high numbers indicating a stronger verification process.

In some embodiments, the location database 145 may also store hashed identity information about users. The location database 145 may store verified identity information from some authorizing entities and not from others, and this may depend on which authorizing entities send hashes to the server computer.

Embodiments of the invention can provide a number of advantages. Embodiments can reduce the computational resources associated with user verification. Verification processes, such as KYC, can be both time intensive and require a significant amount of computational power. Additionally, that time and resources can be unnecessarily duplicated as a user is verified by multiple users. Even when multiple authorizing entities are sharing identity information in order to verify a user, embodiments can still keep the identity information secure. If malicious entities intercept messages with identity information in an attempt to steal the user's identity, cryptographic hashes can keep the sensitive information safe. Additionally, embodiments can prevent user information from being shared with entities beyond those approved by the user. For example, hashes can prevent the server computer from learning any information about the user. Authorizing entities may only receive verification data about identity information that they received from the user directly, even if the user sent other identity information to other authorizing entities.

Any of the software components or functions described in this application, may be implemented as software code to be executed by a processor using any suitable computer language such as, for example, Java, C++ or Perl using, for example, conventional or object-oriented techniques. The software code may be stored as a series of instructions, or commands on a computer-readable medium, such as a random access memory (RAM), a read only memory (ROM), a magnetic medium such as a hard-drive, or an optical medium such as a CD-ROM. Any such computer-readable medium may reside on or within a single computational apparatus, and may be present on or within different computational apparatuses within a system or network.

The above description is illustrative and is not restrictive. Many variations of the invention may become apparent to those skilled in the art upon review of the disclosure. The scope of the invention can, therefore, be determined not with reference to the above description, but instead can be determined with reference to the pending claims along with their full scope or equivalents.

One or more features from any embodiment may be combined with one or more features of any other embodiment without departing from the scope of the invention.

A recitation of "a", "an" or "the" is intended to mean "one or more" unless specifically indicated to the contrary.

All patents, patent applications, publications, and descriptions mentioned above are herein incorporated by reference in their entirety for all purposes. None is admitted to be prior art.

What is claimed is:

1. A method comprising:
   receiving, by a server computer from a plurality of authorizing entity computers, a plurality of indications of hashes of information about a user, wherein a plurality of hashes associated with the plurality of indications of hashes are stored in a plurality of databases;
   determining, by the server computer, a trust score for each of the plurality of authorizing entity computers;
   determining, by the server computer, a first authorizing entity computer with a highest trust score in the plurality of authorizing entity computers;
   receiving, by the server computer, from the first authorizing entity computer, a first hash of information about the user and/or an indication of the first hash of information about the user, wherein the user or information about the user has been verified by the first authorizing entity computer, and the first hash is stored in a first database including a distributed ledger comprising a blockchain;
   storing, by the server computer, a location of the first hash in the first database in a location database, the first database being separate and distinct from the location database;
   receiving, by the server computer, from a second authorizing entity computer, a verification request message about the user, the verification request message comprising a second hash of information about the user;
   retrieving, by the server computer, the first hash from the first database using the location of the first hash;
   comparing, by the server computer, the first hash to the second hash to determine if the first hash and the second hash match;
   determining, by the server computer, that the first hash and the second hash match; and
   responsive to determining that the first hash and the second hash match, sending, by the server computer, a verification response message to the second authorizing entity computer, the verification response message comprising verification data that the user was previously verified.

2. The method of claim 1, wherein determining the trust score for each of the plurality of authorizing entity computers comprises:
   determining, by the server computer, a first trust score for the first authorizing entity computer.

3. The method of claim 2, wherein the method further comprises:
   comparing, by the server computer, the first trust score to a threshold and wherein the verification response message comprises verification data that the trust score is greater than the threshold.

4. The method of claim 1, wherein the verification response message comprises verification data that the user was previously verified by the first authorizing entity computer.

5. The method of claim 1, wherein the indication of the first hash comprises the location of the first hash in the first database.

6. The method of claim 1, wherein the location database is not a distributed ledger.

7. The method of claim 1, wherein the user is a person.

8. A server computer comprising:
   a hardware processor; and
   a computer-readable medium, coupled to the processor, causing the hardware processor to perform a method comprising:
   receiving, from a plurality of authorizing entity computers, a plurality of indications of hashes of information about a user, wherein a plurality of hashes associated with the plurality of indications of hashes are stored in a plurality of databases;
   determining a trust score for each of the plurality of authorizing entity computers;
   determining a first authorizing entity computer with a highest trust score in the plurality of authorizing entity computers;
   receiving, from the first authorizing entity computer, a first hash of information about the user and/or an indication of the first hash of information about the user, wherein the user or information about the user has been verified by the first authorizing entity computer, and the first hash is stored in a first database including a distributed ledger comprising a blockchain;
   storing a location of the first hash in the first database in a location database, the first database being separate and distinct from the location database;
   receiving from a second authorizing entity computer, a verification request message about the user, the verification request message comprising a second hash of information about the user;

retrieving the first hash from the first database using the location of the first hash;

comparing the first hash to the second hash to determine if the first hash and the second hash match;

determining that the first hash and the second hash match; and responsive to determining that the first hash and the second hash match, sending a verification response message to the second authorizing entity computer, the verification response message comprising verification data that the user was previously verified.

9. The server computer of claim 8, determining the trust score for each of the plurality of authorizing entity computers comprises:

determining a first trust score for the first authorizing entity computer.

10. The server computer of claim 9, wherein the method further comprises:

comparing the first trust score to a threshold and wherein the verification response message comprises verification data that the trust score is greater than the threshold.

11. The server computer of claim 8, wherein the verification response message comprises verification data that the user was previously verified by the first authorizing entity computer.

12. The server computer of claim 8, wherein the indication of the first hash comprises the location of the first hash in the first database.

13. The server computer of claim 8, wherein the location database is not a distributed ledger.

14. The server computer of claim 8, wherein the user is a person.

* * * * *